(12) United States Patent
Lee

(10) Patent No.: US 6,760,168 B2
(45) Date of Patent: Jul. 6, 2004

(54) TIR PRISM SYSTEM FOR DMD AND PROJECTOR ADOPTING THE SAME

(75) Inventor: Seung Gyu Lee, Yongin (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 09/924,172

(22) Filed: Aug. 6, 2001

(65) Prior Publication Data

US 2002/0021505 A1 Feb. 21, 2002

(30) Foreign Application Priority Data

Aug. 10, 2000 (KR) .......................................... 2000-46442

(51) Int. Cl.$^7$ ............................................... G02B 5/04
(52) U.S. Cl. ...................................... 359/834; 359/837
(58) Field of Search .................................. 359/831, 834, 359/837, 211; 348/771; 353/81

(56) References Cited

U.S. PATENT DOCUMENTS

| | | | |
|---|---|---|---|
| 5,309,188 A | | 5/1994 | Burstyn ........................ 353/33 |
| 5,467,146 A | | 11/1995 | Huang et al. ............... 348/743 |
| 6,179,424 B1 | * | 1/2001 | Sawamura ................... 348/771 |
| 6,250,763 B1 | * | 6/2001 | Fielding et al. ............. 348/771 |
| 6,382,799 B1 | * | 5/2002 | Nishikawa et al. ......... 348/771 |

FOREIGN PATENT DOCUMENTS

| | | |
|---|---|---|
| DE | 19815649 A1 | 4/1998 |
| EP | 0418947 A1 | 8/1990 |
| JP | 10082959 | 3/1998 |
| WO | 96/36184 | 11/1996 |

* cited by examiner

Primary Examiner—Euncha Cherry
(74) Attorney, Agent, or Firm—Fleshner & Kim, LLP

(57) ABSTRACT

A TIR prism system for DMD and a projector adopting the same make a loss of incidence light be reduced, and having a small size and light weight. In a TIR prism system having the DMD and for total reflecting the incidence light to a certain direction in accordance with that the DMD is controlled, the TIR prism system of the present invention includes a first prism for receiving the incidence light on a surface set before, refracting the light, and outputting the refracted light, and a second prism coupled to the first prism for receiving the light outputted from the first prism, transmitting the light to the DMD, and outputting the transmitted light after being totally reflected in accordance with that the DMD is controlled, whereby a loss of light energy inside the system can be reduced.

29 Claims, 8 Drawing Sheets

TIR PRISM SYSTEM FOR DMD AND PROJECTOR ADOPTING THE SAME

BACKGROUND OF THE INVENTION

1. Field of the Invention

The present invention relates to a TIR (Total Internal Reflection) prism system for DMD(Digital Micromirror Device) and a projector adopting the same, and particularly, to a TIR prism system for DMD and a projector adopting the same which reduces the loss of incident light, and has a small size and light weight.

2. Description of the Background Art

A projector which is used frequently nowadays is a device for displaying an image using a display element such as an LCD (Liquid Crystal Display) element or a DMD (Digital Micromirror Device), and because it has a small size and light weight, it is distributed widely. Herein, the LCD element has a function of light valve display element, and the DMD has a function of light switch display element.

The DMD is a projection type display element developed by TI (Texas Instruments), US so as to control the light in a DLP (Digital Light Processing) system, and it is a microchip which is made such that a plurality of micromirrors (or micro aluminum mirrors) of 16 μm are planted on a silicon wafer with a 1 μm interval. And a thousand millions of micromirrors may be planted on the microchip.

The thousands millions of micromirrors planted on the microchip are able to display image on a screen by being controlled locations (two modes of on and off) so as to reflect the incident light within the angle of +10° through −10°. Herein, the strength of the light outputted from the DMD is subordinated by the outputting time of the light as a certain angle, and therefore if the outputting time of the light as a certain angle is long, the strength of the light becomes stronger.

General operating characteristics of the DMD will be described as follows.

FIG. 1 is a block diagram showing general operating characteristics of the projector using the DMD, as shown therein, the projector comprises a light source 9 such as a lamp, a DMD 10 receiving the light outputted from the light source 9 and reflecting the incident light as a certain angle according to a certain signal, a projection lens 11 throwing the light reflected from the DMD 10 on a certain screen 15, and an absorption plate 13 for absorbing the light reflected from the DMD 10 at a certain angle but is not incident upon the projection lens 11.

Herein, the DMD 10 includes a blackboard 1, a plurality of electrodes 3 provided on the blackboard 1, digital micromirrors 5 receiving the light outputted from the light source 9 and reflecting the light at a certain angle, and a supporting member 7 for supporting the digital micromirrors 5.

The plurality of electrodes 3 generate an electrostatic field by a voltage signal inputted from outside so as to support movements of the supporting member 7. Then the digital micromirrors 5 of tiny square shape of 16 μm attached on the supporting member 7 are rotated within the angle range of ±10°, and reflects the light inputted from the light source 9 to the projection lens 11 or to the absorption plate 13 in accordance with the rotating angle. The projection lens 11 receives the light reflected from the DMD 10 and projects the light to the screen 15 to display the image thereon.

The operation of the projector constructed as above will be described in more detail as follows.

The digital micromirrors 5 are slanted at a certain initial angle against the plane, when the light outputted from the light source 9 is projected to the micromirrors 5, the digital micromirrors 5 does not reflect the light to the projection lens 11, but reflects to the absorption plate 13. Therefore, the screen 15 becomes black.

And, when a voltage signal is inputted to the plurality of electrodes 3 disposed on the blackboard 1, the plurality of electrodes 3 generates the electrostatic field so as to rotate the supporting member 7 within a certain angle range of +10° through −10°. At that time, the digital micromirrors 5 attached on the supporting member 7 are rotated with the supporting member 7, and therefore the light inputted into the digital micromirrors 5 is reflected to the projection lens 11. When the light inputted into the projection lens 11 is reflected to the screen 15 through the projection lens 11, the screen 15 becomes white.

Therefore, when the voltage signal from outer electric power source to the plurality of electrodes 3, the electrodes 3 generate the electrostatic field so as to rotate the supporting member 7 within the angle of ±10°. Accordingly, the digital micromirrors 5 projects the light outputted from the light source 9 to the screen 15. At that time, the digital micromirrors 5 are rotated at a high speed (on/off operations) according to the inputted motion image signal.

The projector using the DMD of operation characteristics can be divided into a projector of direct reflection type and a projector of TIR prism type, according to input/output type of the light to the DMD.

FIG. 2 is a perspective view showing a projector of direct reflection type for DMD according to the conventional art. As shown therein, the projector includes a light source 19, a color wheel 17 for changing the color of the light outputted from the light source 19 to red, green, and blue and outputting the light, and a DMD 20 receiving the light outputted from the color wheel 17 and reflecting the light to a screen 23. Herein, the DMD 20 is made as a chip and attached on a board 21.

The projector like above displays image on the screen 23 by reflecting the light outputted from the light source 19 using DMD 20. Herein, the color wheel 17 is a wheel having an element which changes the color of the light into red, green, and blue, and outputs it, and is rotated at a certain rotating speed.

However, the projector of direct reflection type is not able to reduce the size of an optical system, and therefore a projector using an optical system such as the TIR prism is developed.

FIG. 3A is a plane view showing a projector using the TIR prism system for DMD according to the conventional art, and FIG. 3B is a perspective view of FIG. 3A. As shown therein, the projector includes a light source 25; a color Wheel 27 changing the color of the light inputted from the light source 25 into red, green, and blue, and outputting the changed color; a stick lens 29 receiving the light outputted from the color wheel 27 and outputting a light of a certain intensity; a first condensing lens 30 for collecting the light outputted from the stick lens 29 and reducing a diameter of the light; a mirror 31 for reflecting the light outputted from the first condensing lens 30 at a certain angle; a second condensing lens 32 for collecting the light outputted from the mirror 31 and outputting the light; a TIR prism system 33 receiving the light outputted from the second condensing lens 32 and outputting the light according to a certain image signal; a DMD 35 controlling the light proceeded inside the TIR prism system 33; and a projection lens 37 receiving the light outputted from the TIR prism system 33 and outputting it to a certain screen 38. Herein, the TIR prism system 33 for DMD 35 will be described in more detail.

FIG. 4A is a perspective view showing the TIR prism system 33 shown in FIG. 3, and FIG. 4B is a side view of FIG. 4A. As shown therein, the TIR prism system 35 includes an incident prism 33-1 receiving the light proceeded from the light source 25 on a certain position P1 on a surface IS5 and total projecting the light (IS4;P2 and IS2;P3); and an outputting prism 33-2 coupled to the incident prism 33-1 at a certain angle, receiving the light transmitted (OS4; P3) from the incident prism 33-1, total reflecting the light inside (OS1; P4 and OS4;P5) without total reflecting when the light is inputted, and then outputting the light (OS2; P6). That is, the incident prism 33-1 and the outputting prism 33-2 are coupled with a tiny gap, therefore the light proceeded from the incident prism 33-1 to the outputting prism 33-2 is not totally reflected on a coupling surface (that is, the surface where the incident prism 33-1 and the outputting prism 33-2 are coupled), and the light inputted into the outputting prism 33-2 is totally reflected on the coupling surface in order to be outputted.

Herein, the referenced dotted line and solid line in the respective surfaces designates a rear surface of the solid view, and the referenced solid line designates a front surface of the solid view.

On the other hand, the DMD 35 attached on a lower surface OS1 of the outputting prism 33-2 totally reflects the light inputted through the lower surface (OS1; P4), and outputs the light through an inclined plane (OS4; P5) of the outputting prism 33-2 and through an outputting surface (OS2; P6).

The incident prism 33-1 and the outputting prism 33-2 included in the TIR prism system 33 will be described in more detail.

FIG. 5A is a perspective view showing the outputting prism 33-2 of the TIR prism system shown in FIG. 4A. As shown therein, the outputting prism 33-2 is a right-angled prism in which the surface OS1 contacted to the DMD and a surface OS2 outputting the light make a right angle, and the inclined plane OS4 for totally reflecting the light reflected from the DMD is included in the outputting prism 33-2.

FIG. 5B is a perspective view showing the incident prism 33-1 of the TIR prism system shown in FIG. 4A. And a manufacturing process of the incident prism 33-1 from a certain right-angled pole will be described as follows.

First, the right-angled pole is cut as a certain angle a1=∠T1T4T3 for a surface IS1, and then the right-angled pole is cut as a certain angle a2=∠T1T2T3. Then, the right-angled pole having the surface IS3 is made. And, the right-angled pole is cut as an angle a3=∠T1T2T6 for a surface IS5, and is cut as an angle a4=∠T4T3T7 for a surface IS2, whereby the incident prism 33-1 is made.

Herein, the angles of the incident prism 33-1 are decided so that the light inputted inside the incident prism is reached to the micromirrors of the DMD after totally reflected, in consideration of rotation directions of the plurality of micromirrors of the DMD (that is, slant direction for an edge of the DMD). Accordingly, the angles of the outputting prism which is coupled to the incident prism are decided.

The projector using the TIR prism system 33-1 and 33-2 fabricated as above displays an image on the screen 38 by controlling the light generated by the light source so as to be projected to the screen 38 through the color wheel 27, the rod lens 29, the first condensing lens 30, the mirror 31, the second condensing lens 33, the TIR prism system 33, the DMD 35, and the projection lens 37.

However, the projector using the TIR prism system of reflection type has a large TIR prism system 33, and the manufactured products have a large size because the DMD is attached on a lower surface of the TIR prism system 33.

Also, the TIR prism system is fabricated so that the light inputted into the incident prism proceeds as a slanted direction against the vertical surface of the proceeding direction and reaches to the DMD in order to be totally reflected to the DMD, and at least four angles are calculated. Therefore, it is difficult to manufacture the prism system, and it needs high cost.

Also, as shown in FIGS. 4A and 4B, since the TIR prism system outputs the light through the processes of transmission P1, a total reflection P2, a transmission P3, a reflection from the DMD P4, a total reflection P5, and transmission P6, and the efficiency of the light energy is lowered.

SUMMARY OF THE INVENTION

Therefore, an object of the present invention is to provide a TIR (Total Internal Reflection) prism system for DMD (Digital Micromirror Device) by which a loss of incident light can be reduced.

Another object of the present invention is to provide a projector using the TIR prism system for DMD by which the size and weight of the projector can be reduced.

To achieve these and other advantages in accordance with the purpose of the present invention, as embodied and broadly described herein, there is provided a TIR prism system for DMD, in which the DMD is planted and the light is totally internal reflected in accordance with that the DMD is controlled, comprising: a first prism for receiving the light on a predetermined surface and refracting, and then outputting the refracted light; and a second prism coupled to the first prism for receiving the light outputted from the first prism and transmitting it to the DMD, and totally reflecting and outputting the light according to control of the DMD.

In addition, there is provided a projector using the TIR prism system for DMD comprising: a light source generating and outputting a certain light; light processing units for processing the light outputted from the light source and outputting parallel ray; a TIR prism system for receiving the light outputted from the light processing units and outputting the light gone through 3 transmissions and 1 total reflection; a DMD for controlling a passage of the light so that the light totally reflected can be outputted from the TIR prism system; and a projection lens 370 for receiving the light outputted from the DMD and outputting it to a certain screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
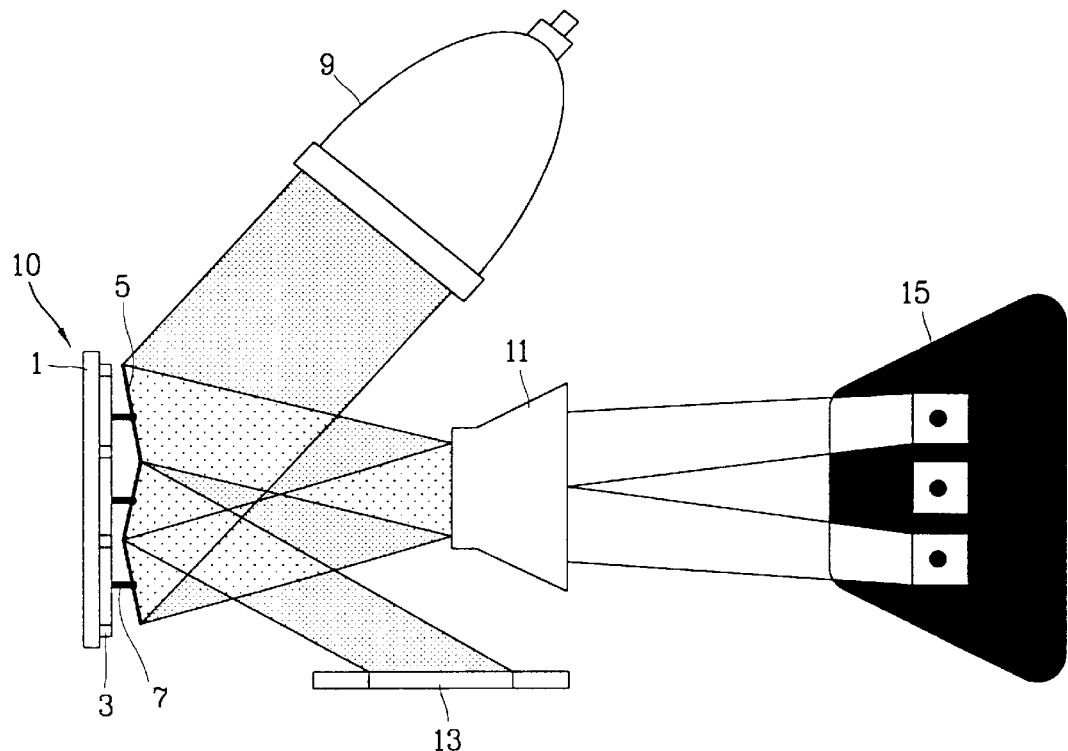
FIG. 1 is a block diagram for describing general operation characteristics of a projector using a DMD.
Figure 2:
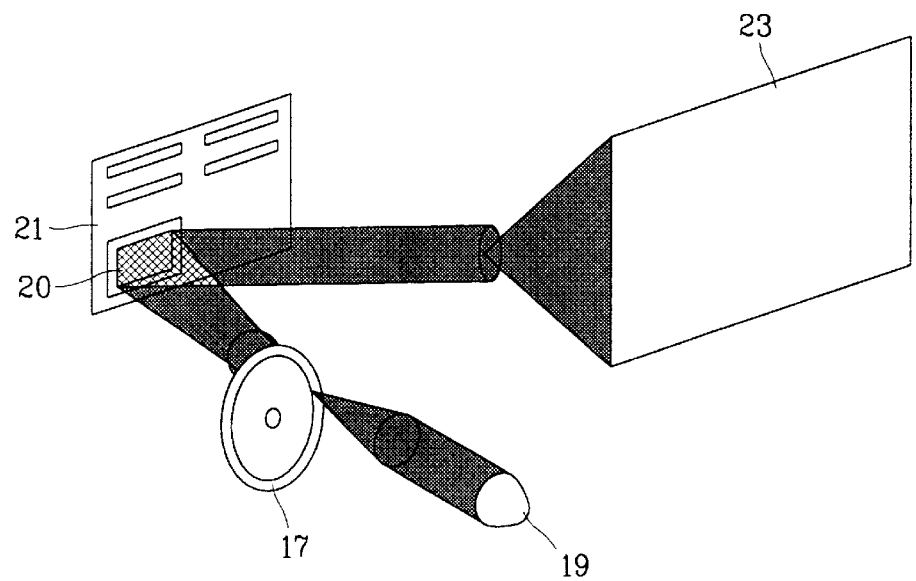
FIG. 2 is a perspective view showing a projector of direct reflection type for DMD according to the conventional art.
Figure 3A:
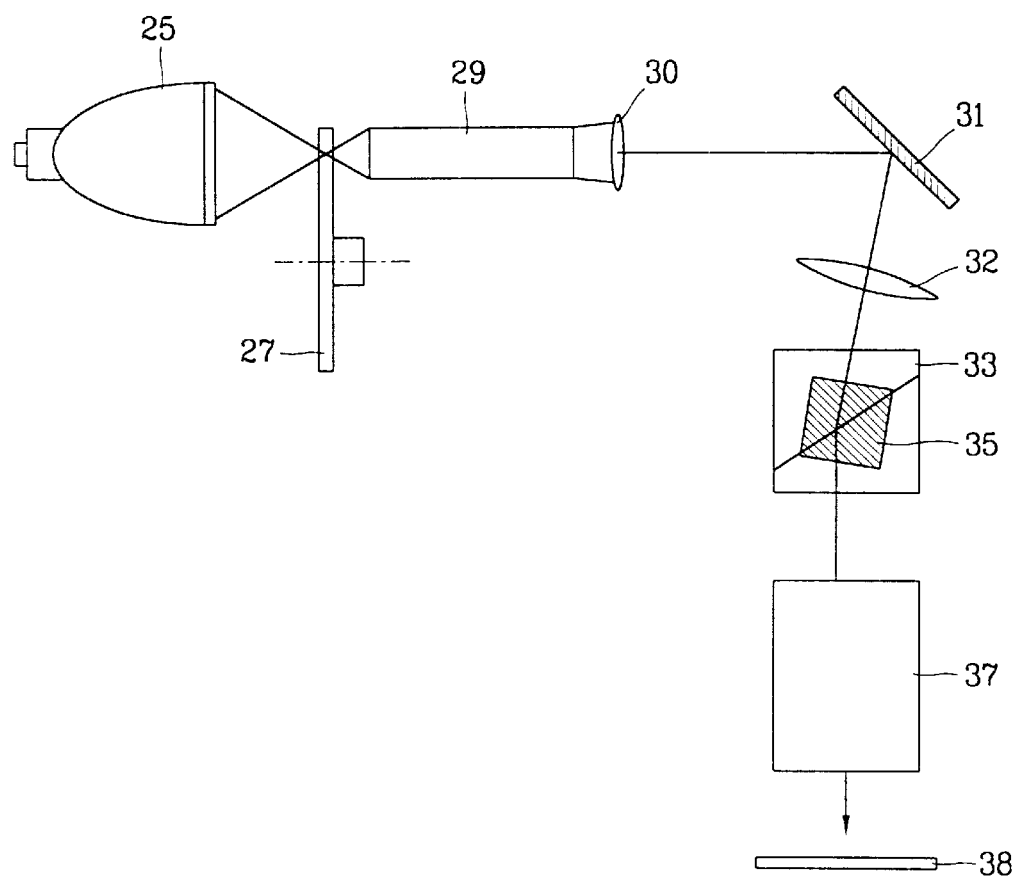
FIG. 3A is a plane view showing a projector using a TIR prism system for DMD according to the conventional art.
Figure 3B:
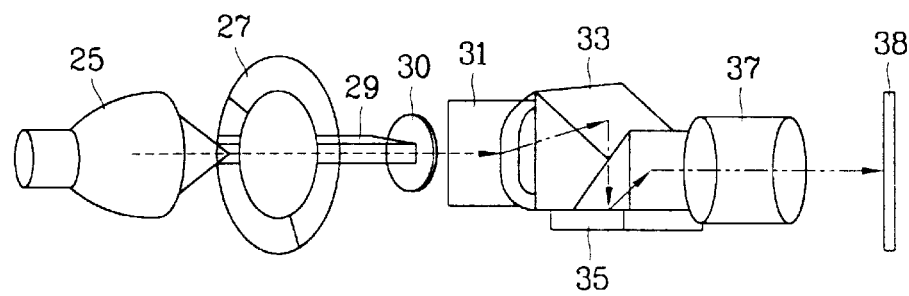
FIG. 3B is a perspective view of FIG. 3A.
Figure 4A:
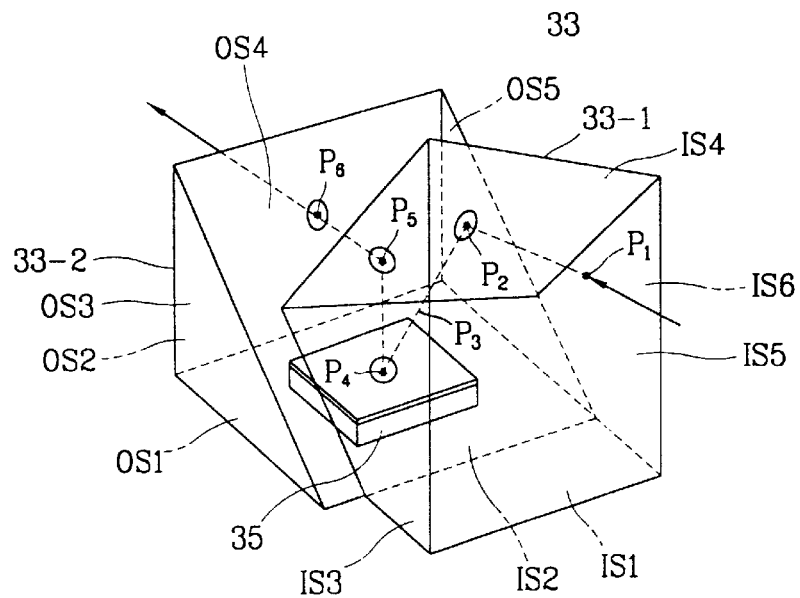
FIG. 4A is a solid view showing the TIR prism system shown in FIG. 3.
Figure 4B:
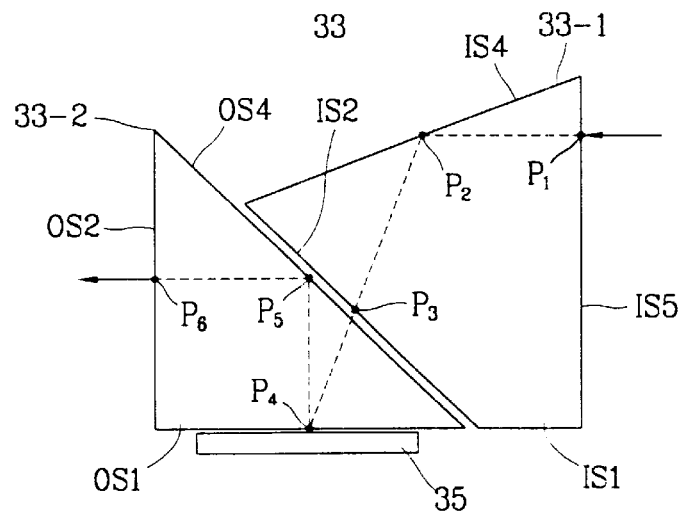
FIG. 4B is a side view of FIG. 4A.
Figure 5A:
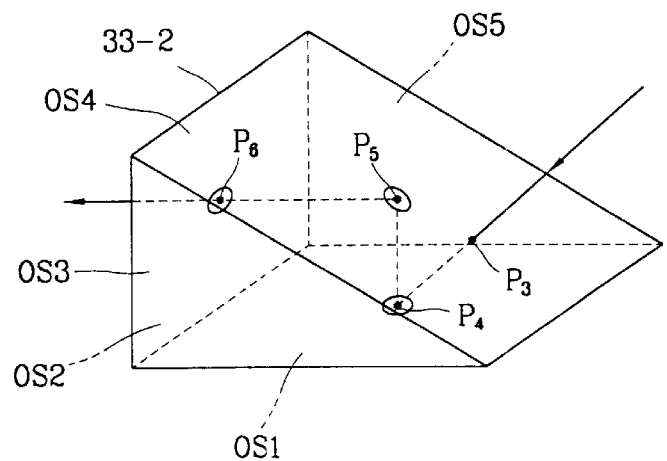
FIG. 5A is a perspective view showing an outputting prism of the TIR prism system shown in FIG. 4A.
Figure 5B:
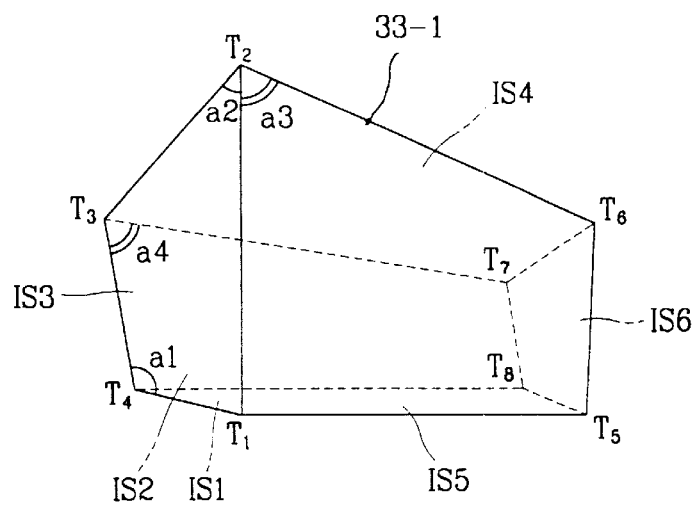
FIG. 5B is a perspective view showing an incident prism of the TIR prism system shown in FIG. 4A.
Figure 6:
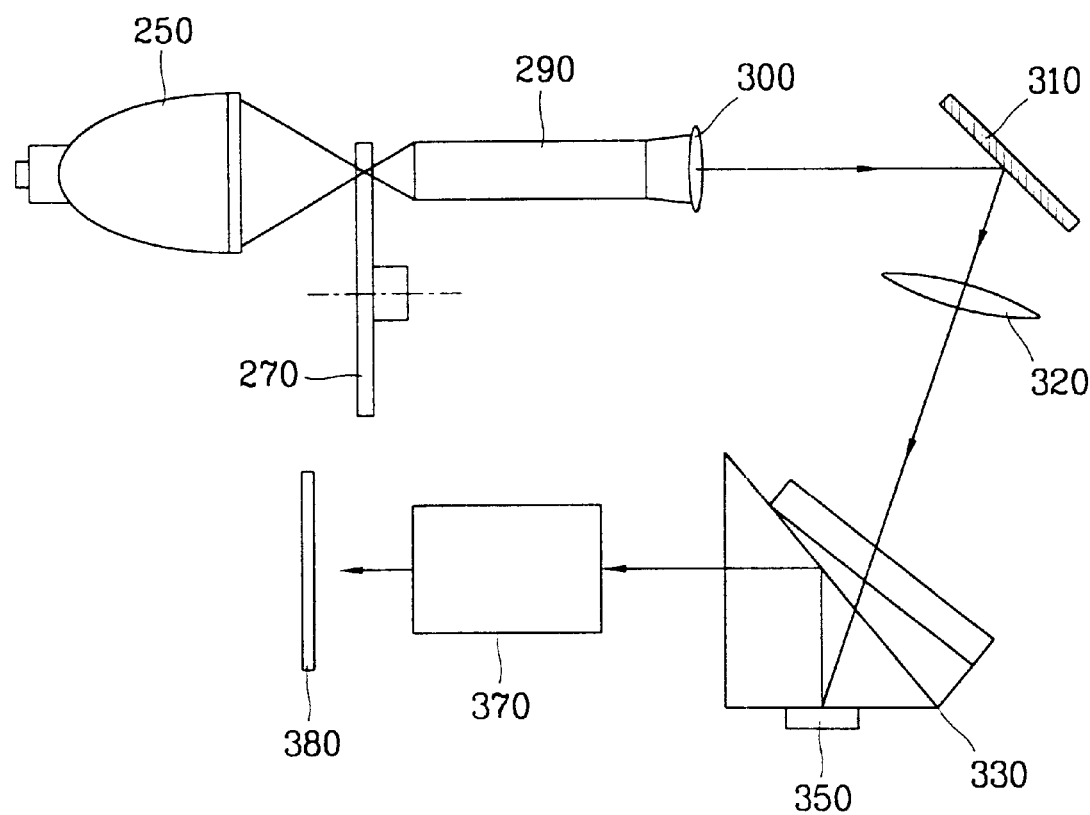
FIG. 6 is a plane view showing a projector using a TIR prism system for DMD according to the present invention.

FIG. 6 is a plane view showing a projector using a TIR prism system for DMD according to the present invention. As shown therein, the projector comprises: a light source 250; a color wheel 270 for changing the light outputted from the light source 250 into red, green, and blue, and outputting the light; a rod lens 290 for receiving the light outputted from the color wheel 270 and outputting the light by generating the light of a certain intensity; a first condensing lens 300 for collecting the light outputted from the rod lens 290 and reducing the diameter; a mirror 310 for reflecting the light outputted from the rod lens 290 at a certain angle; a second condensing lens 320 for collecting the light reflected from the mirror 310 and outputting the light; a TIR (Total Internal Reflection) prism system 330 for receiving the light outputted from the second condensing lens 320 and outputting the light according to a certain image signal; a DMD (Digital Micromirror Device) 350 for controlling the light proceeding inside the TIR prism system 330; and a projection lens 370 for receiving the light outputted from the TIR prism system 330 and outputting it on a certain screen 380. Herein, the TIR prism system 330 for DMD 350 will be described in more detail as follows.

Figure 7A:
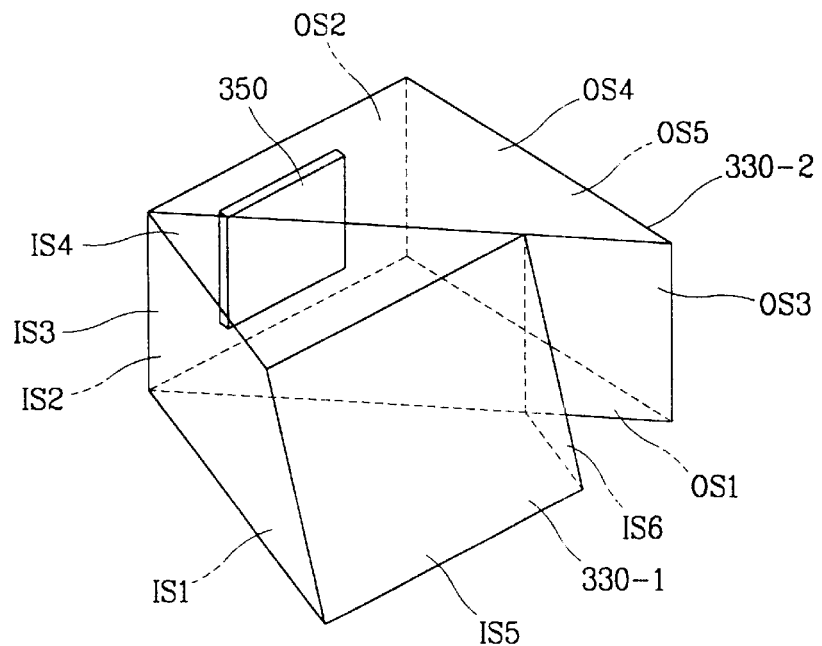
FIG. 7A is a perspective view showing the TIR prism system for DMD in FIG. 6.
Figure 7B:
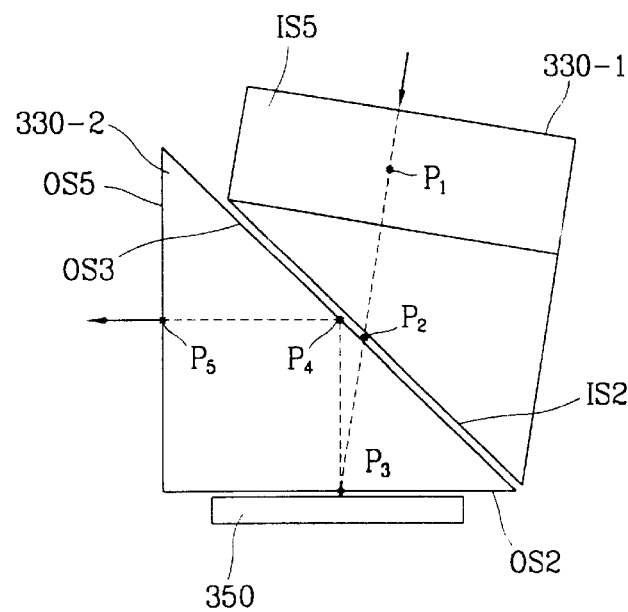
FIG. 7B is a plane view of FIG. 7A.

FIG. 7A is a perspective view showing the TIR prism system 330 for DMD in FIG. 6, and FIG. 7B is a plane view of FIG. 7A. As shown therein, the TIR prism system includes an incident prism 330-1 for receiving the light proceeding from the light source 250 on a certain surface IS5 and transmitting the light to a surface IS3; and an outputting prism 330-2 coupled to the incident prism 330-1 at a certain angle, total reflecting the light transmitted from the incident prism 330-1 on a surface OS1 and outputting the light through an outputting surface OS5. Herein, the incident prism 330-1 and the outputting prism 330-2 are coupled with a tiny gap between them, and therefore the light inputted into the outputting prism 330-2 is outputted as total reflected on the coupled surface without a transmission.

Herein, the referenced dotted line and solid line in the respective surfaces designates a rear surface of the solid view, and the referenced solid line designates a front surface of the solid view.

On the other hand, the DMD 350 attached on a side surface OS2 (a reflecting surface) of the outputting prism 330-2 outputs the light inputted into the DMD 350 through the side surface (OS2; P3) of the outputting prism 330-2 as total reflected through an inclined surface (OS3;P4) of the outputting prism 330-2 and through the outputting surface (OS5; P5).

The incident prism 330-1 and the outputting prism 330-2 included in the TIR prism system 330 will be described in more detail as follows.

Figure 8A:
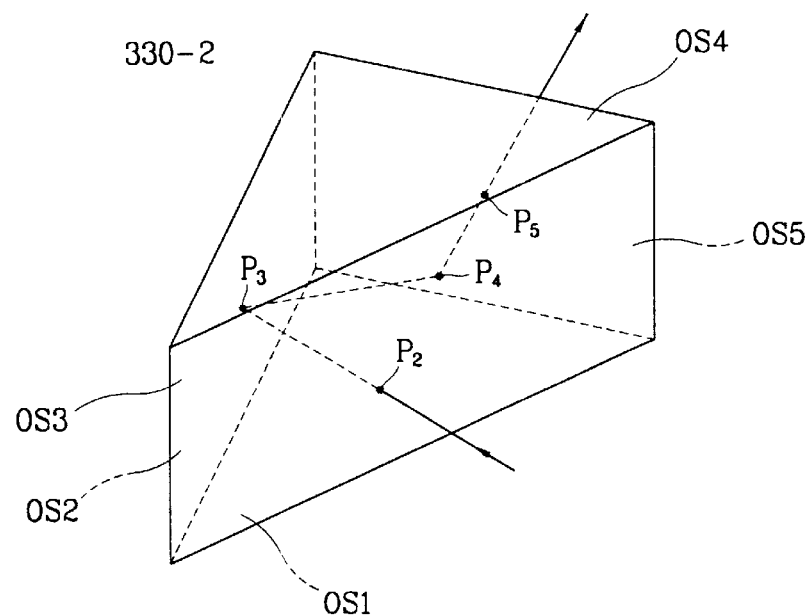
FIG. 8A is a perspective view showing an incident prism of the TIR prism system for DMD shown in FIG. 7A.

FIG. 8A is a perspective view showing the outputting prism 330-2 of the TIR prism system for DMD shown in FIG. 7A. As shown therein, the outputting prism is a right-angled prism in which a surface OS2 contacted to the DMD and the outputting surface OS5 make a right angle, and an inclined surface OS3 for total reflecting the light reflected from the DMD is included.

Figure 8B:
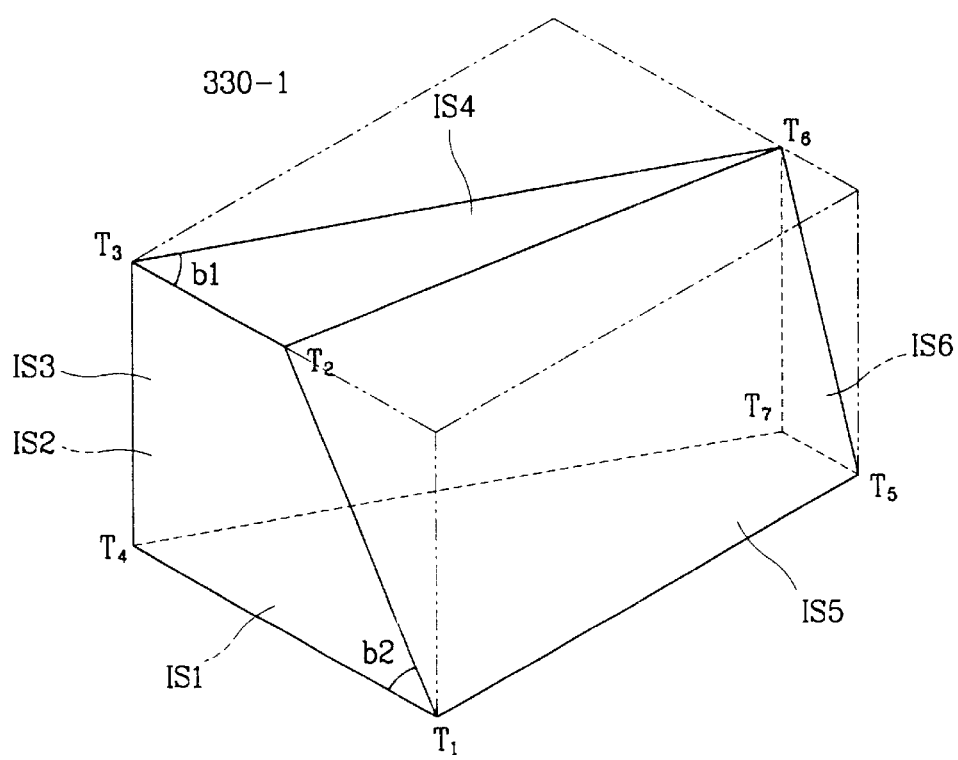
FIG. 8B is a perspective view showing an outputting prism of the TIR prism system for DMD shown in FIG. 7A.

FIG. 8B is a perspective view showing the incident prism 330-1 of the TIR prism system 330 for DMD shown in FIG. 7A, and the manufacturing process from a right angled pole will be described as follows.

First, the right-angled pole is cut as an angle b1=∠T2T3T6 or ∠T1T4T7 for a surface IS2, and is cut as an angle b2=∠T4T1T2 or ∠T7T5T6 for the surface IS1, whereby the incident prism 330-1 is fabricated.

Herein, a calculation process of the angles (or surface angles) used for fabricating the prism will be described in more detail as follows.

As shown in FIGS. 7A and 7B, when the light parallel with a paper is inputted on the surface IS5 of the incident prism 330-25. it is made to be the angle b2 for the surface IS3 so that the light is refracted as a certain angle. Then, the light inputted into and refracted from the incident prism 330-1 transmits the coupled surface IS2 or OS3 and is inputted into the DMD 350 attached on the side surface OS2 of the outputting prism 330-2. And the light reflected from the DMD 350 is totally reflected on the coupled surface OS3 or IS2. The totally reflected light is outputted through the surface OS5 of the outputting prism 330-2.

Herein, if the light inputted on the coupled surface is inputted as an angle of larger than 1/sin (n/n'), the light is totally reflected. Herein, the n and n' designate refractivity of medium. That is, when two media having different refractivities are coupled to each other, the light proceeding from one medium to another medium is totally reflected inside the medium according to the angle of incident to the medium.

For example, an angle of total reflection of the medium which has the refractivity (n) of 1.5 can be found as follows using the Snell's law.

$$n \sin(a) = n'/\sin(a') \tag{1}$$

herein, n' is the refractivity of air and is assumed as 1, and the a' is the refracting angle and should be more than 90°, then the incidence angle a is about 41.8°.

According to the relation described above, the angles of coupled surfaces IS2 or OS3 of the incident prism or of the outputting prism for the surface on which the DMD is attached can be adjusted.

Herein, the light transmitting the surface OS3 of the outputting prism 330-2 from the incident prism 330-1 is refracted in the incident prism 330-1, because the digital micromirrors planted on the DMD are rotated within the angle of ±10° and slanted at an angle of 7.1° against the plane.

Therefore, the angle of light incidence from the surface IS2 of the incident prism 330-1 to the surface OS3 of the outputting prism 330-2 should be adjusted in order to total reflect the light inputted into the DMD to the surface OS3 of the outputting prism 330-2. That is, because the digital micromirrors are set to be one of the ±10° as slanted directions, in order to total reflect the light inputted into the DMD, the digital micromirrors are changed to one of the set angles(±10°) and the angles are set to total reflect the light to the digital micromirrors.

Also, the light totally reflected on the DMD is totally reflected after inputted on the surface OS3, and then the light is outputted through the surface OS5. At that time, the light inputted on the surface OS3 is satisfied the total reflection angle from the DMD set before.

Therefore, the TIR prism system 330 having the above described structure according to the present invention inputs (IS5;P1) or transmits(IS2;P2) the light proceeding from the light source, and reflects (OS2;P3), total reflects (OS3;P4) and transmits (OS5;P5).

Figure 9A:
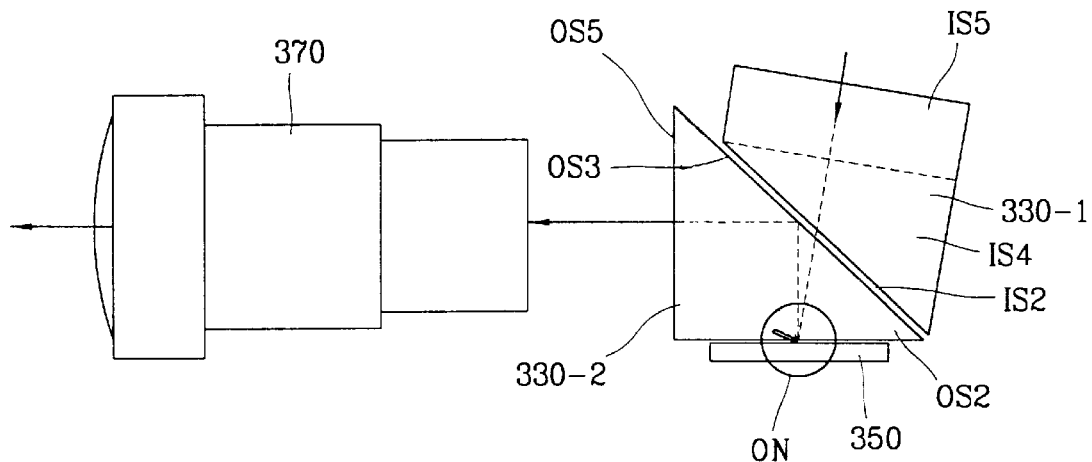
FIGS. 9A and 9B are plane views showing operating characteristics of the TIR prism system for DMD in FIG. 7.
Figure 9B:
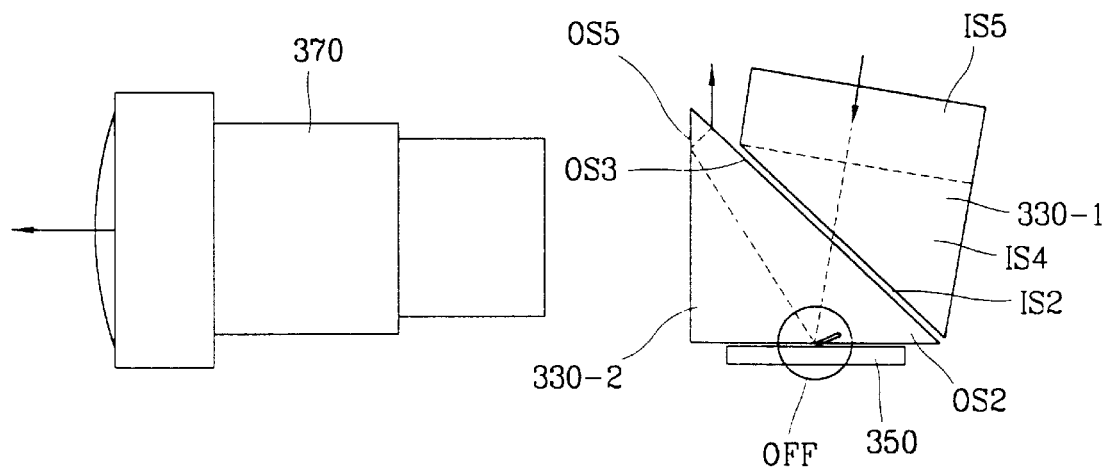

FIGS. 9A and 9B are plane views showing operation characteristics of the TIR prism system for DMD, FIG. 9A is showing a case that the digital micromirrors of the DMD are in ON state, and FIG. 9B is showing a case that the digital micromirrors of the DMD are in OFF state.

The light inputted on the surface IS5 of the incident prism 330-1 having a certain refractivity is refracted in the incident prism 330-1, and then transmits an air layer between the coupled surfaces IS5 and OS3 and the surface OS3 of the outputting prism 330-2, and is inputted into the DMD 350. ON or OFF state of the DMD 350 is decided according to the positions of the digital micromirrors planted on the DMD 350. For example, as shown in FIG. 9A, if the digital micromirrors planted on the DMD 350 are slanted as +10° for the plane, the TIR prism system 330 is in ON state and outputs the light on the projection lens 370. Also, as shown in FIG. 9B, if the digital micromirrors planted on the DMD 350 are slanted as —10° for the plane, the TIR prism system 330 is in OFF state and the light is totally reflected on the surface OS5 and outputted to another direction not to the projection lens 370.

Therefore, the projector using the TIR prism system 330-1 and 330-2 fabricated as described above displays an image on a screen by operating so that the light generated in the light source 250 projected on the screen 380 through the color wheel 270, the rod lens 290, the first condensing lens 300, the mirror 310, the second condensing lens 320, the TIR prism system 330, the DMD 350 and the projection lens 370, as described in alignment of the optical system.

As described above, the TIR prism system inputs (IS5;P1) or transmits (IS2;P2) the light processed from the light source, and reflects (OS2;P3), total reflects (OS3;P4) and transmits (OS5;P5) the light from the DMD, whereby a loss of light energy can be reduced inside the system.

Also, the TIR prism system according to the present invention is easily fabricated at low cost because only two angles are needed to be calculated.

Also, the projector using the TIR prism system has the DMD attached on the side surface of the TIR prism system, whereby the height and size of the product can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. In a TIR (Total Internal Reflection) prism system on which a DMD (Digital Micromirror Device) is attached, and for totally reflecting an incident light in a certain direction in accordance with control of the DMD, the TIR prism system for DMD comprising:

a first prism for receiving the incident light on a surface at an angle, refracting the incident light at a certain angle and outputting the refracted light; and a second prism coupled to the first prism and having the DMD attached to a surface thereof for receiving the light outputted from the first prism, transmitting the light to the DMD, and outputting the light as totally reflected in accordance with control of the DMD;

wherein the first prism includes:

an incident surface slanted at a first predetermined angle relative to a first adjoining surface for receiving and refracting the incident light, wherein the first adjoining surface is substantially perpendicular to the DMD; and an outputting surface through which the incident light is transmitted, wherein the outputting surface is slanted at a second angle relative to a second adjoining surface different from the first adjoining surface, such that light reflected from the DMD is totally internally reflected inside the second prism before exiting the second prism.

2. The system of claim 1, wherein the first adjoining surface is substantially parallel to the incident light.

3. The system of claim 1, wherein the first prism changes a passage of the light by transmitting the incident light, and transmits the light through the outputting surface, and wherein the incident light only contacts two surfaces of the first prism.

4. The system of claim 1, wherein the first prism and the second prism are optically coupled via an air layer gap.

5. The system of claim 1, wherein the second prism includes:

an incident surface optically coupled to the outputting surface of the first prism for inputting the light outputted from the first prism and totally internally reflecting the light reflected from the DMD;

a reflecting surface in contact with the DMD; and an outputting surface for outputting the light totally internally reflected by the incident surface.

6. The system of claim 1, wherein the DMD includes micromirrors rotatable at predetermined angles.

7. The system of claim 1, wherein the incident light is transmitted to the second prism without total internal reflection in the first prism.

8. The system of claim 7, wherein the incident light is optically coupled to the second prism without total internal reflection in the first prism.

9. The system of claim 1, wherein the first prism is an incident prism and comprises six surfaces, wherein at least one surface has a triangular shape.

10. The system of claim 9, wherein one angle in the at least one triangular shaped surface is the same angle as one angle in a non-adjacent surface.

11. The system of claim 9, wherein at least one surface has a quadrangle shape, and wherein one angle in the at least one triangular shaped surface is the same angle as one angle in said at least one quadrangle shape surface.

12. The system of claim 9, wherein at least two surfaces of the first prism have triangular shapes.

13. The system of claim 12, wherein one angle of each of the at least two triangular shaped surfaces is the same angle as one angle in a surface not adjacent to the respective triangular surfaces.

14. The system of claim 1, wherein the incident surface is oblique with respect to the incident light.

15. A projector using a total internal reflection (TIR) prism system for DMD, comprising:
   a light source for generating and outputting a light;
   a light processing unit for processing the light outputted from the light source and outputting parallel rays of light;
   a TIR prism system for receiving the light outputted from the light processing unit and outputting the light;
   a DMD coupled to the TIR prism system for controlling the passage of the light inside the TIR prism system to enable the light totally internally reflected in the TIR prism system to be outputted; and
   a projection lens for receiving the light outputted from the DMD and outputting the light on a screen,
   wherein the TIR prism system includes:
      a first prism for receiving incident light on a surface at an angle relative to the incident light, refracting the incident light at a certain angle and outputting the refracted light; and
      a second prism optically coupled to the first prism for receiving the light outputted from the first prism, transmitting the light to the DMD attached thereto, and outputting the light after total internal reflection in accordance with a state of the DMD, and wherein the first prism includes:
         an incident surface slanted at a first predetermined angle relative to a first adjoining surface for receiving and refracting the incident light, wherein the first adjoining surface is substantially perpendicular to the DMD; and
         an outputting surface slanted at a second angle relative to a second adjoining surface different from the first adjoining surface, such that light reflected from the DMD is totally internally reflected inside the second prism before exiting the second prism.

16. The projector of claim 15, wherein the light processing unit includes:

a color wheel that receives the light outputted from the light source, and outputs light of a corresponding color according to an image signal;
   a rod lens that receives the light outputted from the color wheel, and outputs a light of a certain intensity; and
   a mirror for receiving the light outputted from the rod lens and reflecting the light to the TIR prism system.

17. The projector of claim 16, wherein the light processing unit further includes a first lens for collecting the light inputted on the mirror and a second lens for collecting the light outputted from the mirror and outputting the light to the TIR prism system.

18. The projector of claim 15, wherein the incident light is input in parallel to at least one surface of the first prism.

19. The projector of claim 15, wherein the DMD includes micromirrors for total reflection of light inside the TIR prism system and output of the light from the TIR prism system.

20. The projector of claim 19, wherein an initial state of the DMD is such that the light reflected by the DMD is not output to the projection lens.

21. The projector of claim 15, wherein the micromirrors of the DMD are rotated by a predetermined angle by an electrostatic field generated in accordance with an input image signal.

22. The projector of claim 15, wherein the incident light is coupled to the second prism without total internal reflection in the first prism.

23. The projector ot claim 15, wherein the first prism is an incident prism and comprises six surfaces, wherein at least one surface has a triangular shape.

24. The projector of claim 15, wherein one angle in the at least one triangular shaped surface is the same angle as one angle in a non-adjacent surface.

25. The projector of claim 15, at least one surface has a quadrangle shape, and wherein one angle in the at least one triangular shaped surface is the same angle as one angle in said at least one quadrangle shape surface.

26. The projector of claim 15, wherein at least two surfaces of the first prism have triangular shapes.

27. The system of claim 15, wherein at least two surfaces of the first prism have triangular shapes.

28. The projector of claim 15, wherein the incident light only contacts two surfaces of the first prism.

29. The projector of claim 15, wherein the incident surface is oblique with respect to the incident light.

* * * * *